331-98

SEARCH ROOM

Tr 1144

K-333 1/53

K-1349

K-1380

Sept. 21, 1954 H. M. BROWN 2,689,915

FOLDED LINE OSCILLATOR

Filed Nov. 4, 1944 2 Sheets-Sheet 1

Inventor
HUGH M. BROWN

By [signature]

Attorney

Sept. 21, 1954 H. M. BROWN 2,689,915

FOLDED LINE OSCILLATOR

Filed Nov. 4, 1944 2 Sheets-Sheet 2

Inventor
HUGH M. BROWN

By [signature]
Attorney

Patented Sept. 21, 1954 2,689,915

UNITED STATES PATENT OFFICE 2,689,915

FOLDED LINE OSCILLATOR

Hugh M. Brown, Clemson, S. C., assignor, by mesne assignments, to the United States of America as represented by the Secretary of the Navy Application November 4, 1944, Serial No. 561,943

5 Claims. (Cl. 250—36)

This invention relates to an oscillator capable of producing electrical oscillations in the ultra high frequency band, particularly intermittent or pulsed oscillations.

Previous oscillators have often been found to be unsuitable for pulsed operation because of failure to commence oscillating immediately upon being energized. Furthermore, previous oscillators of the type employing a coaxial transmission line or a cavity in the anode-grid circuit of the oscillator tube are often characterized by excessive physical length of the line or cavity. In addition, adequate means for feeding back energy of proper amount and phase between the output and excitation circuits of the oscillator have often been difficult to attain. And finally, the problem of providing a suitable connector for the anode terminal of the oscillator tube which will provide good electrical contact and at the same time conduct away the heat generated at the anode has often been a difficult one.

Accordingly, it is an object of this invention to produce an oscillator capable of being satisfactorily pulsed into intermittent oscillation. It is a further object of this invention to create an oscillator which will start oscillating immediately upon being energized, and which may be used to produce satisfactorily either pulsed or continuous oscillations.

A further object of this invention is to produce an oscillator having a shortened physical length of the anode-grid resonant line while retaining the necessary electrical length of line.

An additional object of this invention is to produce oscillator resonant circuits having therebetween an effective type of feedback for transferring energy from one circuit to the other to sustain oscillations.

A still further object is to produce novel means for providing good electrical contact to the anode terminal of the oscillator tube, and also to provide a contact which will readily conduct heat away from the anode.

Figures 1, 2, 3:
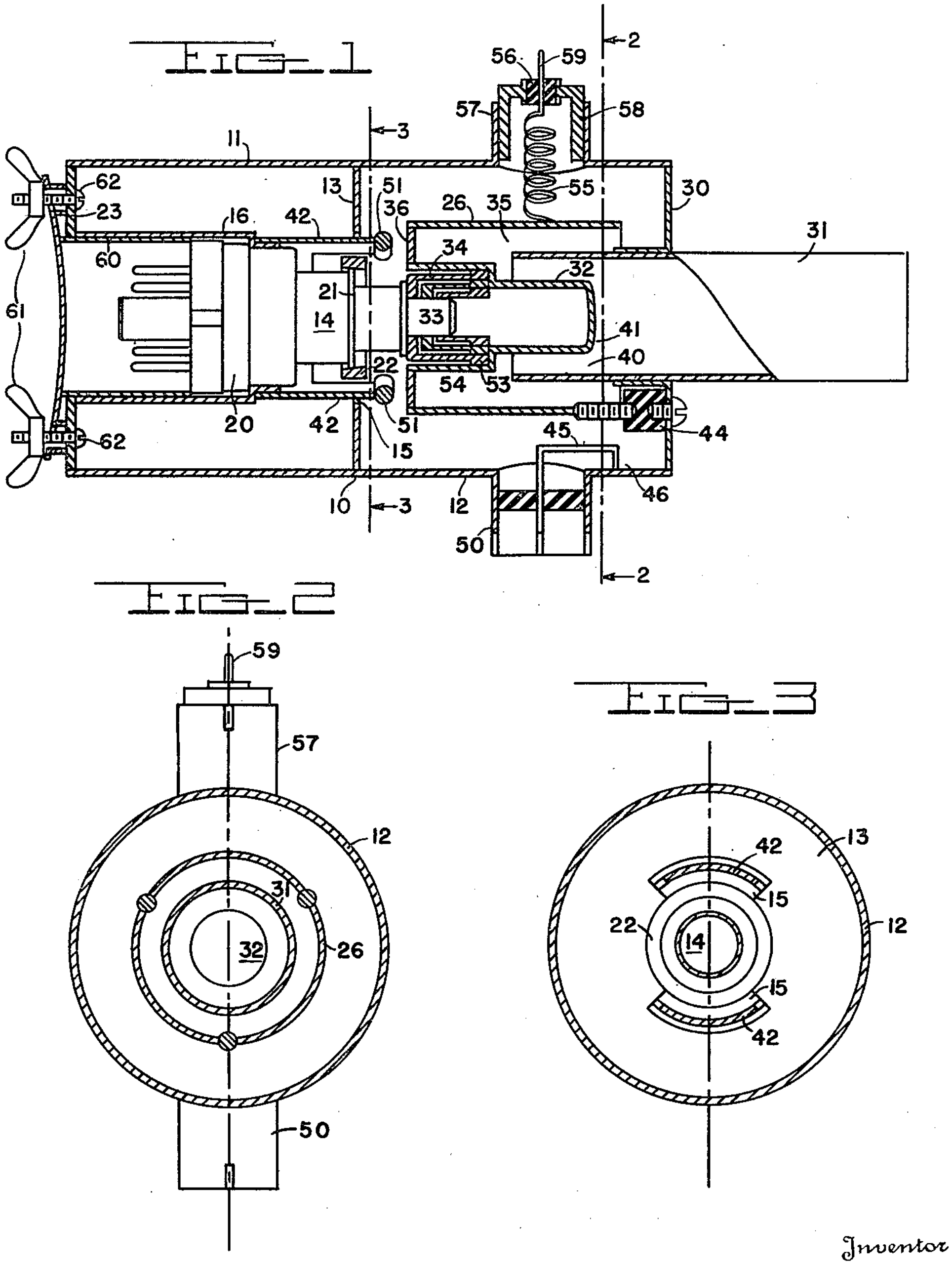

With these objects in mind, an exemplary embodiment of this oscillator is shown in the drawings in which, Figure 1 shows a sectionalized elevation of the oscillator taken along lines 1—1 of Figures 2 and 3.

Figure 4:
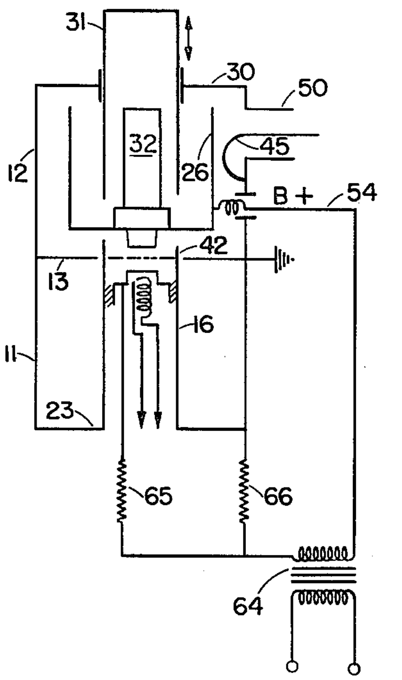
Figure 6:
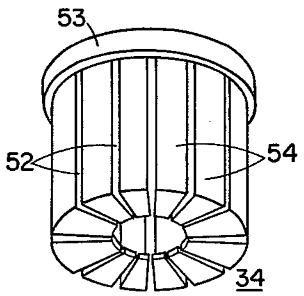
Figure 7:
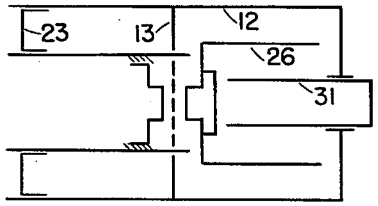
Figure 5:
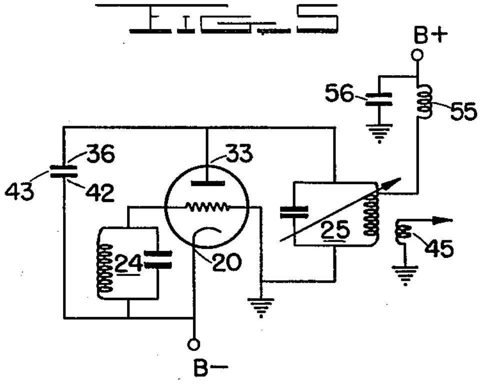
Figure 8:
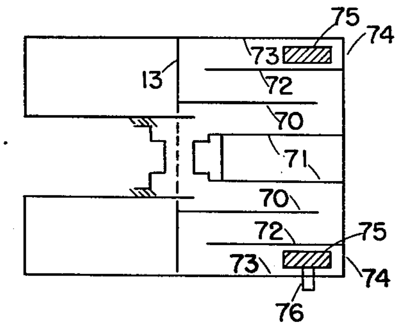

Figure 2 shows a cross-section of the oscillator taken along line 2—2 of Figure 1, Figure 3 shows a cross-sectional view illustrating the diaphragm between oscillator resonant circuits and taken along line 3—3 of Figure 1, Figure 4 shows a schematic diagram of the oscillator illustrating the auxiliary circuit completing the electrical features of the oscillator, Figure 5 illustrates the equivalent circuit of the oscillator, Figure 6 is enlarged view showing one element of the anode connector illustrated also in Figure 1, Figure 7 is a schematic view of another embodiment of this invention and, Figure 8 is a schematic view of an additional embodiment of this invention.

Figure 1 illustrates the preferred embodiment of the oscillator, which is shown schematically in Figure 4. The outer body 10 of the oscillator is shown consisting of a part 11, and a part 12, forming together a single conducting cylinder. Parts 11 and 12 are divided within the oscillator by a transverse diaphragm 13, completely separating parts 11 and 12 of the body 10 except for a hole in the center through which electron tube 14 extends. In addition, arcuate slots 15 shown in Figure 3, are cut in diaphragm 13 near the central hole through which tube 14 extends.

Tube 14, which is held inside oscillator body 10 by inner cylinder 16, is a conventional type of triode known as a lighthouse tube. The cathode of the tube is directly connected to one of the tube prongs shown. In addition, an annular capacitor, built into the tube, connects the cathode of the tube with the lower shell 20 of the tube. Thus, insofar as radial frequency energy is concerned, the cathode of tube 14 may be regarded as being connected directly to the lower shell 20, which in turn contacts firmly the inner surface of cylinder 16.

The control electrode or grid of lighthouse tube 14 is connected to external conducting annular member 21 which forms part of the tube and which, as shown in Figure 1, is wedged into good conducting relation with ring 22 anchored at its edge to the central hole in diaphragm 13. The grid of tube 14 is thus connected through ring 22 to diaphragm 13, which is in turn anchored around its edge to outer body 10. Coaxial cylinders 11 and 16 thus constitute a coaxial transmission line connecting at one end shell 20, connected to the cathode, and at the other end diaphragm 13, connected to the grid. The coaxial line thus formed is short circuited at the extremity of body 10 by the annular closure member 23. The electrical length of the transmission line formed by the cooperation of cylinders 11 and 16 may be made approximately equal to a quarter wave length of the desired frequency of oscillation by properly selecting the axial length of the cavity formed between diaphragm 13 and annular closure member 23. When properly adjusted, a circuit slightly capacitive at the mid-band point of the desired frequency band of oscillation is created between the cathode and grid of tube 14, as shown schematically at 24 in Figure 5.

A resonant circuit 25 (Figure 5) is also connected between the grid and anode of tube 14. As seen in Figure 1, part 12 of body 10 constittues the outer conductor of a second transmission line. The inner conductor of this transmission line is formed by cylinder 26 anchored to connector 34, which in turn bears against anode terminal 33. The inner surface of cylinder 12 and the outer surface of cylinder 26 cooperate to form a coaxial transmission line extending away from diaphragm 13. Cylinder 12 is partially closed at its end by annular closure member 30 through the center of which penetrates a smaller cylinder 31 into the body of the oscillator, extending to within cylinder 26. Annular member 30 and cylinder 31 thus constitute a folded extension of outer conductor 12 of the transmission line 12—26. The electric field of the transmission line thus extends away from diaphragm 13 along the annular chamber between cylinders 12 and 26, reaches annular member 30 at the end of the oscillator, and is doubled back into itself, using the outer surface of cylinder 31 and the inner surface of cylinder 26, as a folded extension of the line.

There is thus formed a coaxial transmission line doubled inwardly back into itself to maintain a given electrical length while shortening the actual physical length by approximately the axial distance that cylinder 31 penetrates into cylinder 26.

In the preferred embodiment of this invention illustrated in Figure 1, a second fold is made in the line by the use of internal cylinder 32 which, like cylinder 26, is also anchored to connector 34. Tube terminal 33 makes good electrical and thermal contact with the special anode connector 34 to be particularly described hereinafter. The inclusion of cylinder 32 extends electrically the line which would otherwise terminate at 35. The line formed by the cooperation of the outer surface of cylinder 31 and the inner surface of cylinder 26 continues around through annular member 36, along connector 34, and to the outside surface of cylinder 32 and the inside surface of cylinder 31. The line finally terminates, open circuited, in the region designated 40. As mentioned before, the line just described is shown schematically at 25 in Figure 5.

The end of cylinder 32 is closed by a rounded cap 41 which eliminates sharp corners on conducting surfaces, thereby preventing arc-over between cylinders 32 and 31.

Feed-back energy necessary to sustain oscillations is transferred between cathode-grid resonant line 24 and anode-grid resonant line 25 described above, by the action of feedback probes 42, anchored at their bases to cylinder 16. The action of the feedback probes 42 has been symbolized in schematic diagram Figure 5 as a condenser 43 connected between cathode and anode of tube 14. While experiments to date indicate that this is the principal action provided by the probes 42, there is considerable evidence to indicate that the reaction between probes 42 and grid diaphragm 13 also has an appreciable effect on the feedback between resonant circuits 24 and 25 (Figure 5).

As illustrated in Figure 1, cylinder 26, which is anchored fixedly to member 36, connector 34 and cylinder 32, is held in place within the body of larger cylinder 12 by three insulating holders 44, one of which is shown in Figure 1. Insulating holders 44 are placed between cylinder 26 and annular member 30 at the position of a voltage node or minimum, thereby minimizing the danger from spark-over at the insulating support. Tracing the standing wave on the anode-grid transmission line, which is an electrical half wave length long, it will be seen that a voltage loop or maximum appears between annular member 36 and diaphragm 13. Proceeding along the line between cylinders 12 and 26 away from diaphragm 13, the voltage decreases until a voltage node or minimum is reached in the region of the insulator 44. The voltage then increases in opposite phase between cylinders 26 and 31 and between cylinders 31 and 32, reaching a maximum at the open end of the line at 40, between cylinders 31 and 32. It will thus be seen that the minimum voltage, and hence the optimum point for placement of the insulating holder 44, is approximately as shown in Figure 1. This region also is the region of a current anti-node or maximum, and for this reason output from the oscillator is taken by loop coupling from the vicinity of insulating member 44. This loop 45 is connected to the inside of transmission line cylinder 12 at 46, bending around to form the inner conductor of the output coaxial transmission line, the outer conductor of which is shown at 50.

In order to minimize the danger of arc-over between surfaces within the oscillator body, all edges are rounded as shown, for example, in the ring shaped termination 51 of probes 42, and in the rounded cap 41 which closes cylinder 32.

Anode connector 34 will now be more particularly described by reference to Figures 1 and 6. Connector 34 may be best described as a series of three nested thimbles, most clearly seen in Figure 1. A hole is made in the end of the thimbles into which anode terminal 33 may be inserted. A plurality of axial, diametrical slots 52 are cut in the end of the thimbles almost down to the base 53, as shown in Figure 6, which illustrates, in the interest of clarity, only the outer of the three nested thimbles. Slots 52 result in a series of fingers 54 extending away from the base or ring 53 in a direction parallel to the axis thereof, and bending sharply in toward the axis of the ring, where they contact the anode terminal 33 (Figure 1). The larger thimble, being on the outside, has comparatively long radial fingers, while the inner thimble has short radial fingers becaue of its position closer to the axis of the thimble and hence closer to anode terminal 33. The resulting connector makes good electrical and thermal contact with anode terminal 33, and in addition permits considerable rocking and lateral motion of terminal 33 within the hole in connector 34 while retaining good conductive relationship therewith.

The oscillator described above is made tunable by providing means for allowing cylinder 31 to slide axially within annular member 30. Pulling out cylinder 31 shortens the effective length of the grid-anode resonant transmission line thereby increasing the frequency of oscillation. It will be noted that axial movement of cylinder 31 affects not only the portion of the line between cylinders 26 and 31 but also that portion of the line between cylinders 31 and 32. Movement of cylinder 31 thus has twice the effect it would have if the line had only a single fold, as in the embodiment shown schematically in Figure 7. It has been found in practice that the electrical length of the cathode-grid line of the oscillator has little effect on oscillator operation; in fact this line may be even completely omitted, if desired or, if desired this line may be made tunable as shown in Figure 7. In the preferred embodiment illustrated in Figure 1, the annular member 23 is fixed in the body 10 in such a position that the line is slightly capacitive at the mid-band frequency, without serious detriment to the tunable feature of this oscillator.

Anode supply voltage is introduced into the oscillator through a chimney 57 which holds a conducting cylinder 58. Voltage is applied to cylinder 26 by conductor 59 terminated in a quarter-wave choke in the form of spring 55. A bypass condenser to prevent any RF which might leak through choke 55 from reaching the B+ source is provided in the form of an annular dielectric member 56 inserted between conductor 59 and cylinder 58.

Tube 14 is held firmly in place in cylinder 16 by a cylinder 60 which presses base 20 into the body of the oscillator and causes annular grid ring 21 to bear firmly against ring 22. Cylinder 60 is held within body 10 of the oscillator by the action of wing nuts 61 screwed on to bolts 62.

Referring to Figure 4, the auxiliary electrical circuit used in connection with the oscillator will now be described. A pulse transformer 64 produces a short pulse of high voltage between the cathode and the anode of the oscillator tube causing the oscillator to break into immediate oscillation. Resistors 65 and 66 are placed in the cathode and grid lines respectively, as shown, to produce the proper biases for optimum operation of the oscillator. As shown, the outside cylinder 10 of the oscillator is grounded, thereby simplifying the problem of installation in the chassis of radio apparatus.

Figure 7 illustrates schematically an embodiment of this invention using only a single fold in the anode-grid line instead of a double fold. As will be seen, this is accomplished by omitting cylinder 32 from the anode portion of the transmission line and altering slightly the relative dimensions of the parts. As with the double fold, the single folded embodiment of Figure 7 may be tuned by axial movement of cylinder 31.

Figure 8 illustrates an embodiment of this invention in which the transmission line is folded outwardly instead of inwardly. Referring to Figure 8, the transmission line starts at grid cylinder 70 and the anode cylinder 71, proceeds axially away from the grid diaphragm to the end of the chamber where it folds back and outward and then proceeds along cylinder 70 and cylinder 72. It then refolds outward again, proceeding along cylinder 73 and cylinder 72 and is terminated in a short circuit at wall 74. Inasmuch as the transmission line in the embodiment shown in Figure 8 is short circuited at its end, this oscillator will operate in a mode corresponding to an odd quarter-wave length; that is, one quarter-wave length or three quarter-wave lengths, for example, instead of as a half-wave length line as in the open-circuited embodiment illustrated in Figure 1. Any of the embodiments shown in Figures 4, 7, and 8 may be tuned, if desired, by use of an axially slidable annular member shown, for example, in the schematic diagram, Figure 8, at 75. Annular member 75 may be either of conducting or non-conducting material and may be moved thru a finger 76 extending thru the cylinder 73 or thru a rod inserted thru a hole in wall 74.

I claim:

1. In a multi-electrode vacuum tube cavity oscillator, an oscillator cavity comprising a cylinder forming the inner conductor of a coaxial transmission line and adapted to be connected at one end to one electrode of the oscillator tube, and a second cylinder forming the outer conductor of said line and adapted to be connected at one end to another electrode of the tube, one of said cylinders extending axially beyond said other cylinder and being doubled back around the end of said other cylinder to form a fold in said line.

2. In a vacuum tube cavity oscillator for an oscillator tube having anode and control electrode terminals, an oscillator cavity comprising a first cylinder adapted to be connected to the control electrode terminal of the oscillator tube, a second cylinder located within said first cylinder and having the end nearest the connection of the control electrode to the first cylinder adapted to be connected to the anode terminal of the tube, and a third cylinder located partially within and extending outside the other end of said second cylinder and connected to said first cylinder at a point remote from the control electrode connection thereto.

3. In a cavity oscillator for an oscillator tube having coaxial anode, cathode, and control grid terminals, a first cylinder adapted to be connected at one end to the control grid terminal, a second cylinder located within said first cylinder and having a reentrant flange at one end connected to the anode terminal, a third cylinder located partially within and extending outside of said second cylinder and connected to the other end of said first cylinder, and a fourth cylinder connected to said anode terminal and located within said second cylinder and extending partially within said third cylinder.

4. In a cavity oscillator for an oscillator tube having coaxial anode, cathode, and control grid terminals, a first cavity comprising an inner cylinder connected to the cathode terminal and an outer cylinder connected to the grid terminal, an apertured circular plate forming the connection between said grid terminal and said outer cylinder, a second cavity comprising a first cylinder connected at one end to said circular plate, a second cylinder located within said first cylinder and adapted to be connected at one end to the anode terminal of the tube, a third cylinder located partially within and extending outside of said second cylinder and connected to the other end of said first cylinder, and feedback means extending through the apertures in said plate to couple said first and second cavities.

5. In a cavity oscillator for an oscillator tube having coaxial anode, cathode, and control grid terminals, a first cavity comprising an inner cylinder connected to the cathode terminal and an outer cylinder connected to the grid terminal, an apertured circular plate forming the connection between said grid terminal and said outer cylinder, a second cavity comprising a first cylinder connected at one end to said circular plate, a second cylinder located within said first cylinder and having a reentrant flange at one end connected to the anode terminal, a third cylinder located partially within and extending outside of said second cylinder and connected to the other end of said first cylinder, a fourth cylinder connected to said anode terminal and located within said second cylinder and extending partially within said third cylinder, and feedback means extending through the apertures in said plate to couple said first and second cavities.

References Cited in the file of this patent

UNITED STATES PATENTS

| Number | Name | Date |
|---|---|---|
| 1,667,485 | MacDonald | Apr. 24, 1928 |
| 2,107,387 | Potter | Feb. 8, 1938 |
| 2,176,718 | Linde | Oct. 17, 1939 |
| 2,181,901 | Lindenblad | Dec. 5, 1939 |
| 2,190,712 | Hansen | Feb. 20, 1940 |
| 2,207,846 | Wolff | July 16, 1940 |
| 2,284,405 | McArthur | May 26, 1942 |
| 2,351,744 | Chevigny | June 20, 1944 |
| 2,351,895 | Allerding | June 20, 1944 |
| 2,416,565 | Beggs | Feb. 25, 1947 |
| 2,425,748 | Llewellyn | Aug. 19, 1947 |
| 2,427,558 | Jensen | Sept. 16, 1947 |
| 2,438,912 | Hansen | Apr. 6, 1948 |
| 2,476,725 | Gurewitch | July 19, 1949 |
| 2,523,122 | Kuper | Sept. 19, 1950 |